United States Patent
Bacinschi

(10) Patent No.: US 7,984,139 B2
(45) Date of Patent: Jul. 19, 2011

(54) APPARATUS AND METHOD FOR AUTOMATING SERVER OPTIMIZATION

(75) Inventor: Radim Bacinschi, Vancouver (CA)

(73) Assignee: Business Objects Software Limited, Dublin (IE)

( * ) Notice: Subject to any disclaimer, the term of this patent is extended or adjusted under 35 U.S.C. 154(b) by 1243 days.

(21) Appl. No.: 11/615,728

(22) Filed: Dec. 22, 2006

(65) Prior Publication Data

US 2008/0155074 A1      Jun. 26, 2008

(51) Int. Cl.
   *G06F 15/173* (2006.01)
(52) U.S. Cl. ..................... 709/224; 709/223
(58) Field of Classification Search .............. 709/220, 709/221, 223, 224
   See application file for complete search history.

(56) References Cited

U.S. PATENT DOCUMENTS

| | | | |
|---|---|---|---|
| 6,795,790 B1 * | 9/2004 | Lang et al. ............ 702/123 |
| 2002/0138443 A1 | 9/2002 | Schran et al. |
| 2003/0074606 A1 | 4/2003 | Boker |
| 2004/0210884 A1 | 10/2004 | Raghavachari et al. |
| 2005/0102121 A1 | 5/2005 | Odhner et al. |
| 2005/0102400 A1 | 5/2005 | Nakahara et al. |
| 2006/0224346 A1 | 10/2006 | Morimoto |

OTHER PUBLICATIONS

PCT/US07/87563 ISR, Sep. 26, 2008, Business Objects, S.A.

* cited by examiner

*Primary Examiner* — Yemane Mesfin
(74) *Attorney, Agent, or Firm* — Mintz, Levin, Cohn, Ferris, Glovsky and Popeo, P.C.

(57) ABSTRACT

A computer readable storage medium includes executable instructions for facilitating automatic server optimization in a system. The executable instructions include instructions to accept a set of initialization parameters, analyze a set of one or more configuration sources, determine a set of configuration settings, receive a series of load levels, and select a load level. The set of configuration settings are tested against the load level. An optimal configuration setting for the load level is identified. The optimal configuration setting is recorded.

15 Claims, 6 Drawing Sheets

APPARATUS AND METHOD FOR AUTOMATING SERVER OPTIMIZATION

BRIEF DESCRIPTION OF THE INVENTION

This invention relates generally to server optimization. More particularly, this invention relates to an approach for automating the process of configuring a system of interdependent servers for optimal performance.

BACKGROUND OF THE INVENTION

Server optimization is a complex task, especially in a system of multiple interdependent servers. Many configuration parameters are available allowing for a huge number of possible configuration combinations and this number increases dramatically when multiple machines are involved. Most systems do not provide a specification for the optimal server configuration for their tasks. Consequently, it is up to the system administrator to configure the server system. The optimal configuration is different for every system and the load on each system varies over time. For the system administrator to test each possible configuration with each possible load is not practical. Furthermore, even if an optimal configuration could be determined for each load, it would be an inefficient use of the system administrator's time to reconfigure the server system each time the load changed. The likely result is that one configuration is selected for all loads.

In view of the foregoing, it would be highly advantageous to provide a system that automatically determines the optimal configuration for each load and automatically reconfigures the system for the upcoming load.

SUMMARY OF INVENTION

The invention includes a computer readable storage medium with executable instructions or facilitating automatic server optimization in a system. The executable instructions include instructions to accept a set of initialization parameters analyze a set of one or more configuration sources, determine a set of configuration settings, receive a series of load levels, and select a load level. The set of configuration settings are tested against the load level. An optimal configuration setting for the load level is identified. The optimal configuration setting is recorded.

The invention also includes a computer readable storage medium with executable instructions for facilitating automatic server optimization in a system. The executable instructions include instructions to accept a set of initialization parameters, analyze a set of one or more configuration sources, determine a set of configuration settings, and receive a series of load levels. The set of configuration settings are tested against the series of load levels. The testing includes executable instructions to select a load level, select a configuration setting, apply the configuration setting, simulate the load level and record a set of performance metrics. An optimal configuration setting for each load level in the series of load levels is identified. The optimal configuration setting for each load level in the series of load levels is recorded. An expected load level for an upcoming period of time is calculated. The expected load level is matched to a closest matching load level in the series of load levels. The optimal configuration setting for the closest matching load level is then applied to the system.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The following terminology is used while disclosing embodiments of the invention:

A configuration source or server configuration source is a reference source for a machine. It indicates what specified parameter values should be set to in order for an application on the machine to perform well. In the case of a server configuration source, these parameters may include, but are not limited to, one or more of maximum response time, fault tolerance, maximum number of users, cache size and CPU usage thresholds. A configuration source is a data source such as a text file, database, or registry.

A configuration setting or server configuration setting is a specific set of values assigned to the parameters of a configuration source. In a system comprising multiple software applications and/or multiple machines, the configuration setting is a collective set of values assigned to the parameters of all the configuration sources associated with the system.

A load level or server load level is an amount of stress put on a system. Stress on a single server may be determined by many factors such as the number of users or the number of incoming requests and the like. Stress on a system of servers is further affected by factors such as the number of servers involved in a requested process, the relative location of the servers and the like.

A machine is the hardware (e.g., case, motherboard, CPU) comprising a computer. While a machine may house software applications, the term does not encompass software. A single machine can house multiple servers.

A server is a computer software application. More specifically, a server is an application that provides services to other software applications. The other software applications may be located on the same machine or on a separate machine that is connected to the server machine via a network.

A server system is a plurality of interdependent servers arranged on one or more machines.

Figure 1:
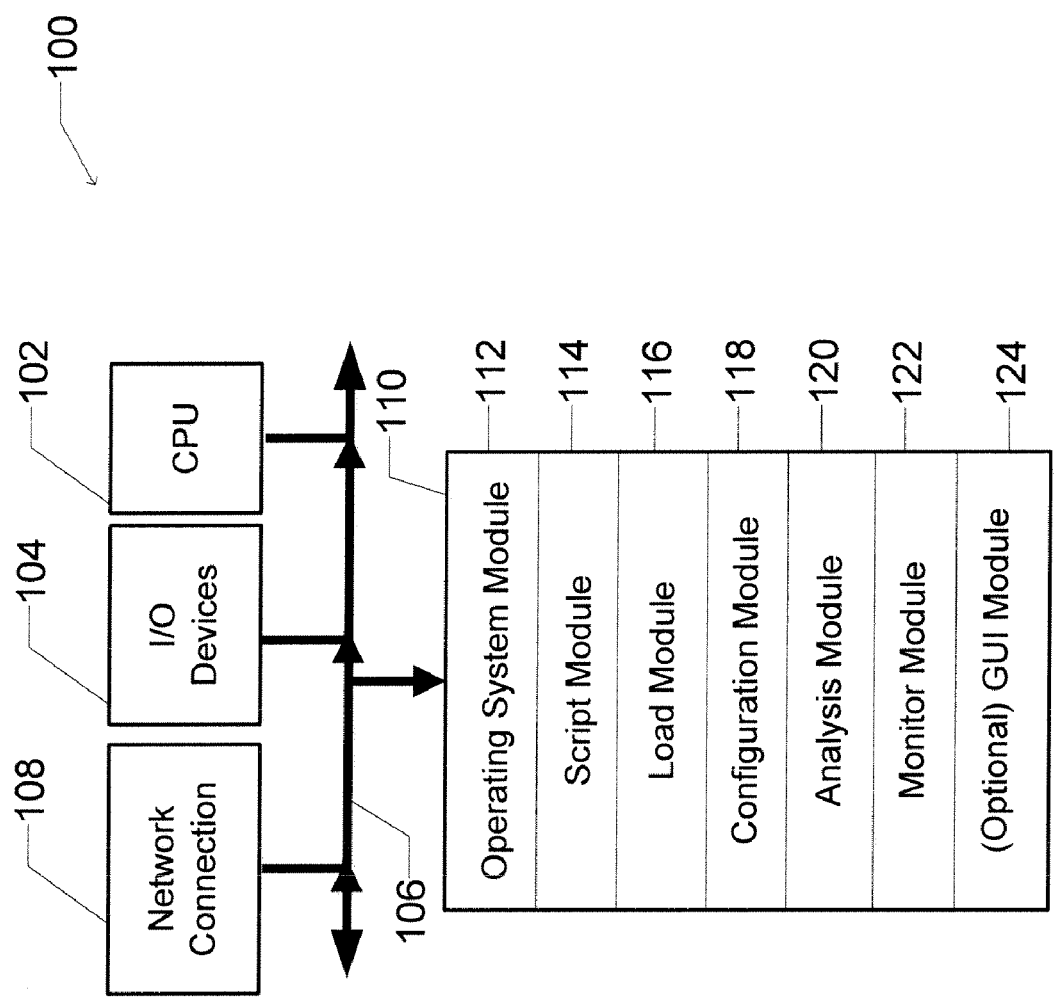
FIG. 1 illustrates a computer including a data source constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit 108 provides connectivity to a network (not shown), thereby allowing the computer 100 to operate in a networked environment.

A memory 110 is also connected to the bus 106. In an embodiment, the memory 110 stores one or more of the following modules: an operating system module 112, a script module 114, a load module 116, a configuration module 118, an analysis module 120, a monitor module 122 and a Graphical User Interface (GUI) module 124.

The operating system module 112 may include instructions for handling various system services, such as file services or for performing hardware dependant tasks.

The script module 114 includes executable instructions to analyze configuration sources and generate configuration test scripts. The load module 116 includes executable instructions to accept a series of specified load levels or determine a series of load levels for a given production system, and simulate load levels during testing. The configuration module 118 includes executable instructions to set and retrieve the parameter values in the configuration sources. The analysis module 120 includes executable instructions to analyze performance metrics to determine patterns, establish rules for load level prediction, select optimal configurations, and to predict upcoming load levels based on historical data. The monitor module 122 includes executable instructions to monitor and record load levels and performance metrics.

The GUI module 124 may rely upon standard techniques to produce graphical components of a user interface, e.g., windows, icons, buttons, menu and the like. The GUI module 124 allows a user to input initialization parameters and view results. In an embodiment, the GUI module 124 resides on a separate computer (not shown) which the user interacts with.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and or the server-side. It is the functions of the invention that are significant, not where they are performed or the specific manner in which they are performed.

In an embodiment, the server optimization system runs in two modes: training mode and production mode. Training mode allows the optimization system to learn how the server system performs under a variety of load levels using different configurations. Optimal configurations are determined in training mode. Production mode uses the information learned in training mode to optimize server system performance, adjusting the configuration for the upcoming load level.

Figure 2:
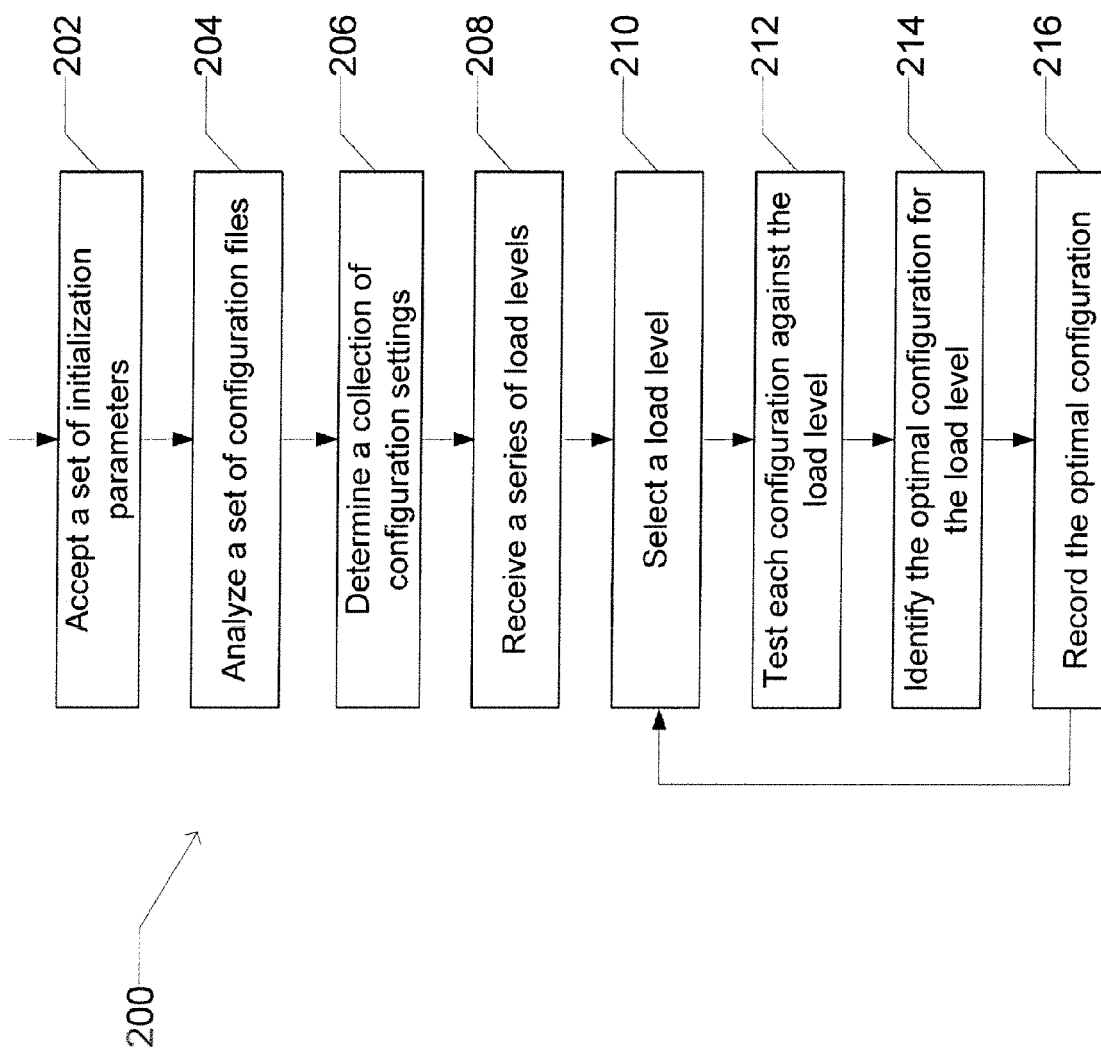
FIG. 2 illustrates processing operations for training the server optimization system in accordance with an embodiment of the invention.

FIG. 2 illustrates a high level training mode workflow 200 associated with an embodiment of the invention. The process begins by accepting a set of initialization parameters 202 specified either by a user or by a default setting. In an embodiment, the initialization parameters comprise one or more of the following: the location of configuration sources, requirements indicating how long the testing should run, available hardware, optimization preferences and the like. As there are many optimization techniques (e.g., fastest response time, highest fault tolerance, least hardware required), optimization preferences allow the user to specify desired optimization techniques. In an embodiment, optimization preferences may be specified for multiple optimization techniques in prioritized order.

The next processing operation is to analyze the set of configuration sources 204. In an embodiment, each machine is associated with a separate configuration source. In an embodiment, multiple machines share a configuration source. In an embodiment, the configuration source includes attributes, such as maximum response time, CPU usage thresholds, fault tolerance, maximum number of threads, cache size and maximum number of users. The set of configuration sources is analyzed by the configuration module 118 for configuration parameters and their ranges. This information is passed to the script module 114 and used to determine a collection of configuration settings 206 to be tested. In an embodiment, the script module 114 selects configuration settings using the middle value and the two extreme values of the range associated with each parameter. In an embodiment, after the initial configuration settings have been tested, the optimal ranges for particular parameters are selected and further values within these ranges are tested to find the most optimal configuration setting. In an embodiment, the script module 114 creates further test configurations which deploy the one or more servers on multiple machines in different configurations. In an embodiment, the script module 114 also creates test configurations using multiple copies of the same server or servers.

The next processing operation is to receive a series of load levels 208. In an embodiment, the load levels are supplied by user input. In an embodiment, the load levels are determined by the load module 116 by monitoring the active production system or by estimating predicted activity. The received load levels reflect load levels expected to occur in the production system.

The next processing operation begins the testing phase of the training mode; a single load level is selected for testing 210 by the load module 116. The load level is then tested against the configuration settings 212 defined in the test script. The results are stored in a data source. In an embodiment, the initialization parameters define a conditional endpoint for the testing phase (e.g., a time limit or a configuration is found that meets a specified requirement). The testing phase runs until all configurations in the test script have been tested for the selected load level or until the conditional endpoint is met. The analysis module 120 determines an optimal configuration for the selected load level 214 and stores the optimal configuration in a data source 216. The next load level is selected 210 by the load module 116 and the testing phase 212-216 is repeated. This occurs until the test phase has been completed for each load level.

Figure 3:
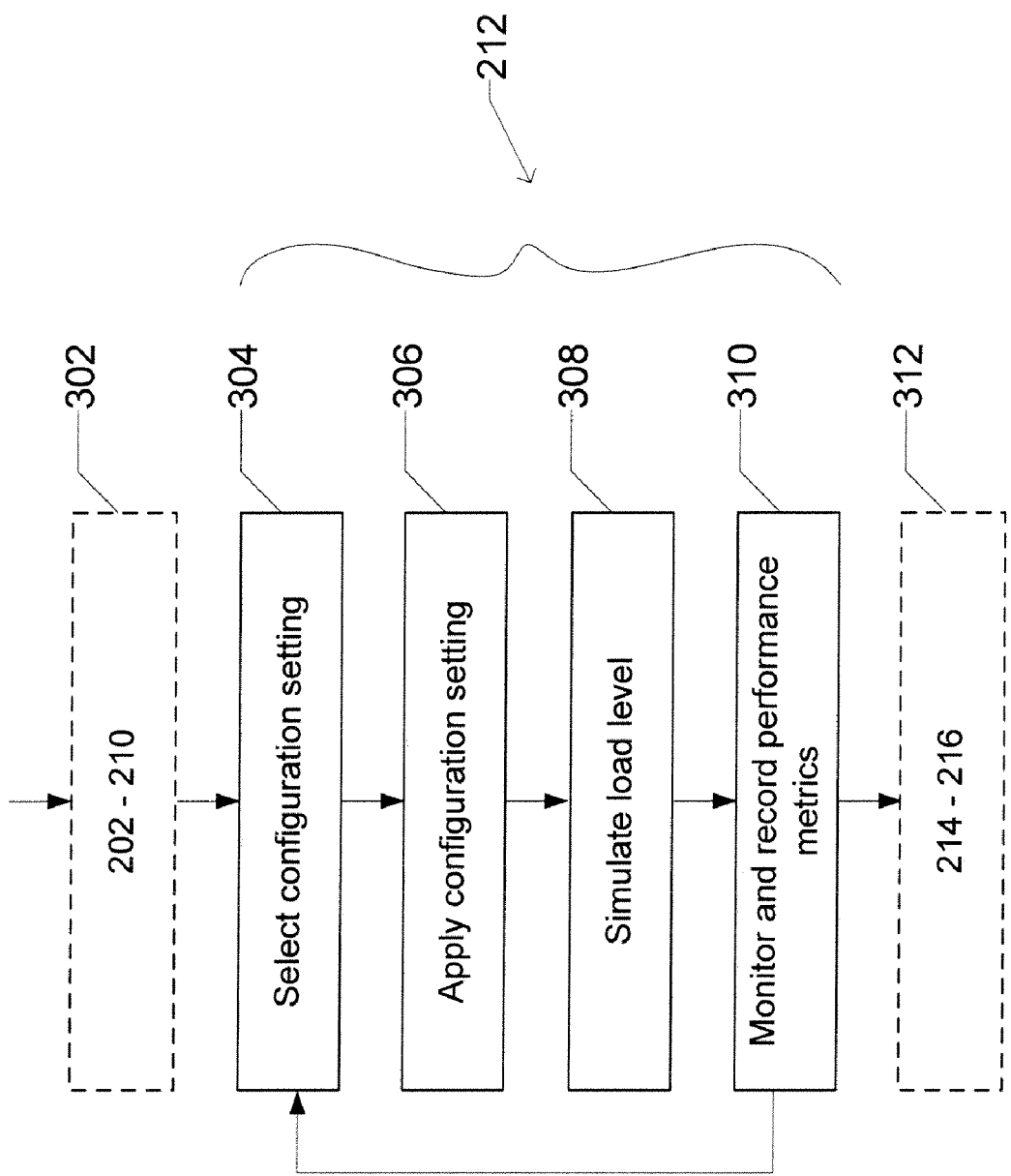
FIG. 3 illustrates an embodiment of detailed processing operations for the testing operation of FIG. 2.

FIG. 3 illustrates an embodiment of the testing operation 212 of FIG. 2 in detail. The processing operations 202-210 of the training mode of FIG. 2 are executed as previously described 302. The script module 116 selects a configuration setting from the test script 304 and it is applied to the configuration source 306. The load module 116 then simulates the selected load level 308 and the monitor module 122 monitors and records performance metrics (e.g., CPU usage, response time, error rate) 310. This process is repeated for each configuration setting in the test script or until the conditional endpoint is met. The processing operations 214-216 of the training mode of FIG. 2 are executed as previously described 312.

Figure 4:
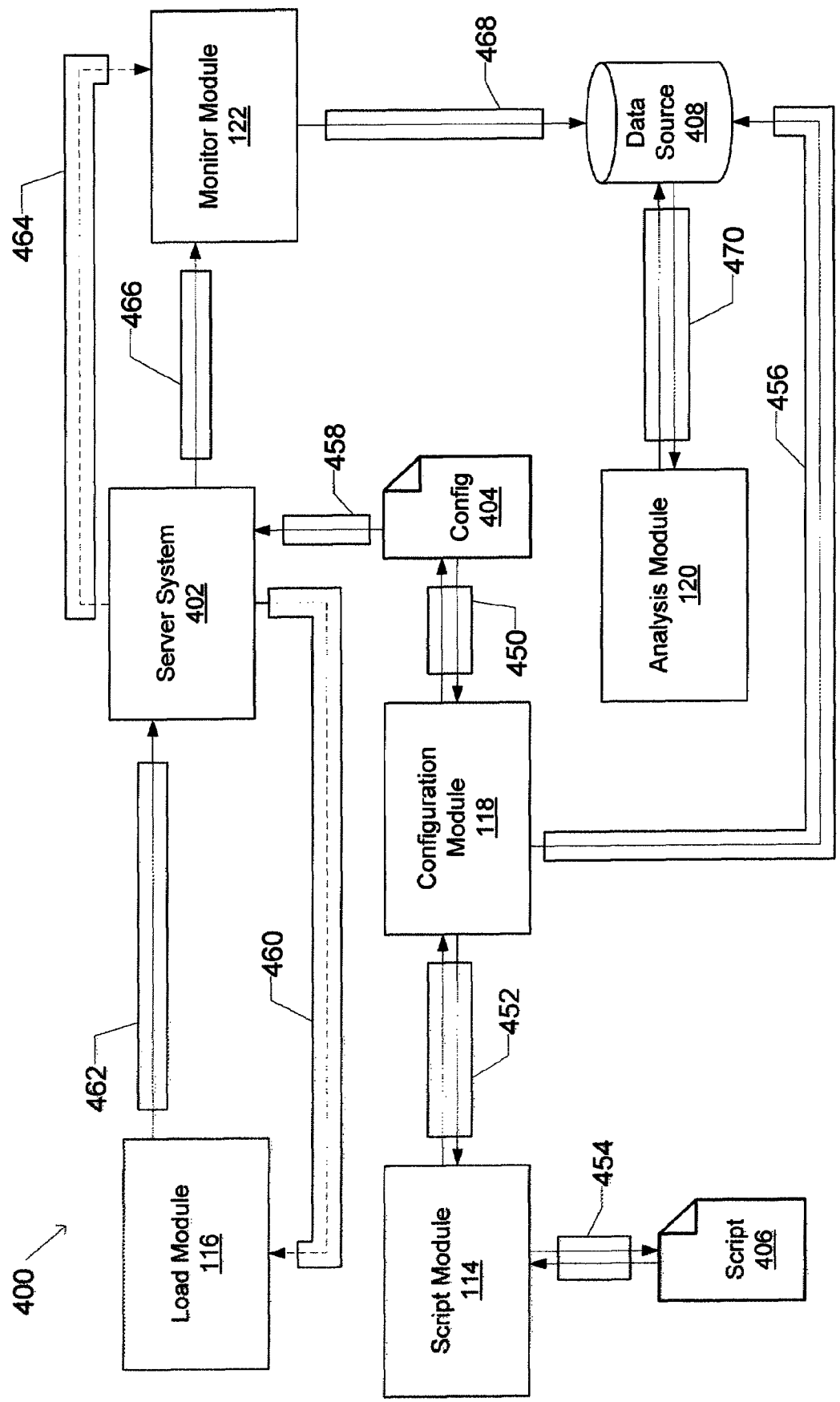
FIG. 4 illustrates the interactions between components of the optimization system in training mode associated with an embodiment of the invention.

FIG. 4 illustrates the interrelationship and interactions between the components of the training system 400. In an embodiment, the modules of the training system 400 exist on a test machine. The server system 402 may be a replica of the production system or the production system itself. A single configuration source is used for simplification.

As shown in FIG. 4 the arrows between components of the training system 400 represent the flow of data across communication channels in an embodiment of the invention. The dataflow establishes the logical arrangement between components. The load module 116 is coupled to a server system 402 and is in communication with a data source 408. The server system 402 is coupled to the monitor module 122 and reads from configuration source 404. The configuration module 118, the analysis module 120 and the monitor module 122 can all write to the data source 408. The analysis module 120 reads from and writes to the data source 408. The configuration module 118 stores the current configuration setting in configuration source 404. The script module 114 stores a script in script file 406. Both of these modules can read from and write to their associated files. The scripts and parameters can be exchanged between the coupled script module 114 and the configuration module 118.

FIG. 4 shows a series of read or write data transfers across communication channels in accordance with an embodiment of the invention. On initiating the training mode of FIG. 2, the configuration module 118 determines the configuration parameters and their ranges by analyzing the configuration source 404 via communication channel 450. The configuration parameters are passed across communication channel 452 to the script module 114. On receiving the parameter and range data the script module 114 analyzes the data and generates a test script 406. This script is written via communication channel 454 to script file 406.

A configuration under test is read from the test script 406 across communication channel 454 and is passed across communication channel 452 from the script module 114 to the configuration module 118. The configuration module 118 records the configuration setting under test in the data source 408 via communication channel 456. The configuration module 118 then updates the configuration source 404 by passing the data across communication channel 450. The server system 402 updates its configuration by reading across communication channel 458. The server system configuration triggers a signal across communication channel 460 to the load module 116 to activate the load process.

The load module 116 has a set of load levels expected to occur on the production server system. The set is either received from a user or is self-generated. The load module 116 selects a load to test and passes a simulated load across communication channel 462 to the server system 402. Initializing the load simulation triggers a signal across communication channel 464 to the monitor module 122.

The monitor module 122 reads performance metrics on the server system 402 across communication channel 466 and records the metrics in the data source 408 via communication channel 468. The performance metrics are associated with the previously recorded configuration setting.

Once the results of testing all configuration settings in the test script 406 against the tested load level have been recorded, the analysis module 120 reads the results from the data source 408 via communication channel 470. The analysis module 120 uses the results to determine the optimal configuration for the tested load. The optimal configuration is recorded in the data source 408 via communication channel 470.

Figure 5:
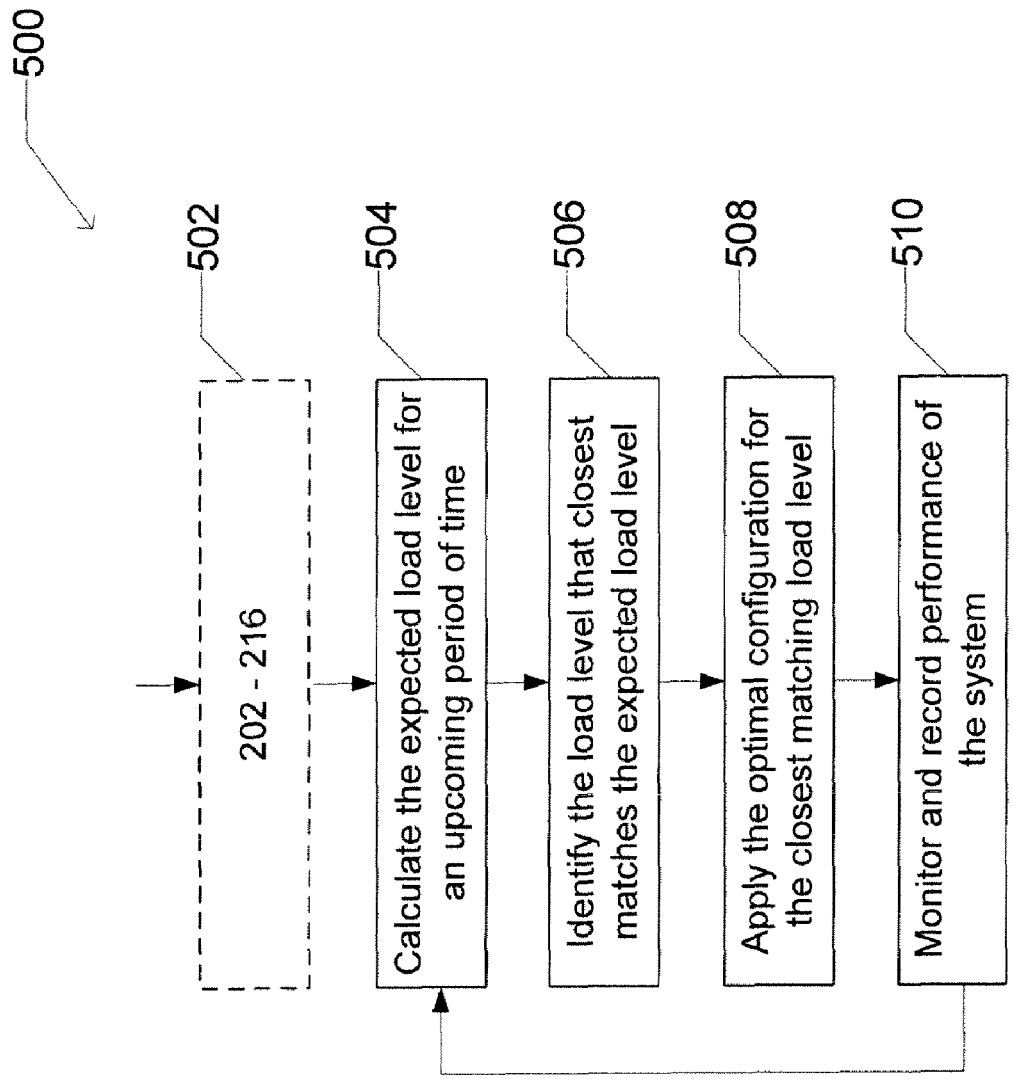
FIG. 5 illustrates processing operations for running the server optimization system in accordance with an embodiment of the invention.

FIG. 5 illustrates the production mode workflow 500 associated with an embodiment of the invention. The processing operations 202-216 of the training mode of FIG. 2 are executed 502, as previously described. Once the training mode is complete, the production mode may be implemented. The first processing operation of the production mode is for the analysis module 120 to calculate the expected load level for the upcoming period of time 504. In an embodiment, the expected load level is calculated by a formula, which may involve parameters such as the current load, the load during the last time interval, the load during the last N time intervals and the upcoming time interval. In an embodiment, a time interval is defined by factors such as time of day, day of week, date, month, year, quarter and time of quarter. The analysis module 120 then identifies the previously tested load level that matches the expected upcoming load level the closest 506. In an embodiment, this is done by comparing the factors that affect load such as the number of users, the types of requests and the number of requests. In the next operation, the configuration module 118 applies the optimal configuration setting for the closest matching load level to the production system 508. In an embodiment, the optimal configuration setting includes the values assigned to the configuration parameters, the intended location of each interdependent server on the available hardware and a count of how many of each server type is required. As the system runs, the monitor module 122 monitors and records performance metrics in a data source for the system 510. The production mode is cyclical, so when the next defined time interval is approaching, the analysis module 120 begins calculating the next expected load level. In an embodiment, this process repeats itself as long as the server optimization system is running.

In an embodiment, the recorded performance metrics are later used by the analysis module to recognize performance patterns and establish rules for determining expected load levels. For example, if the analysis module 120 has recognized that the typical number of users on Sunday evening increases by a factor of two during quarter-end periods, then it can establish a rule to compensate for this when calculating the expected load level.

Figure 6:
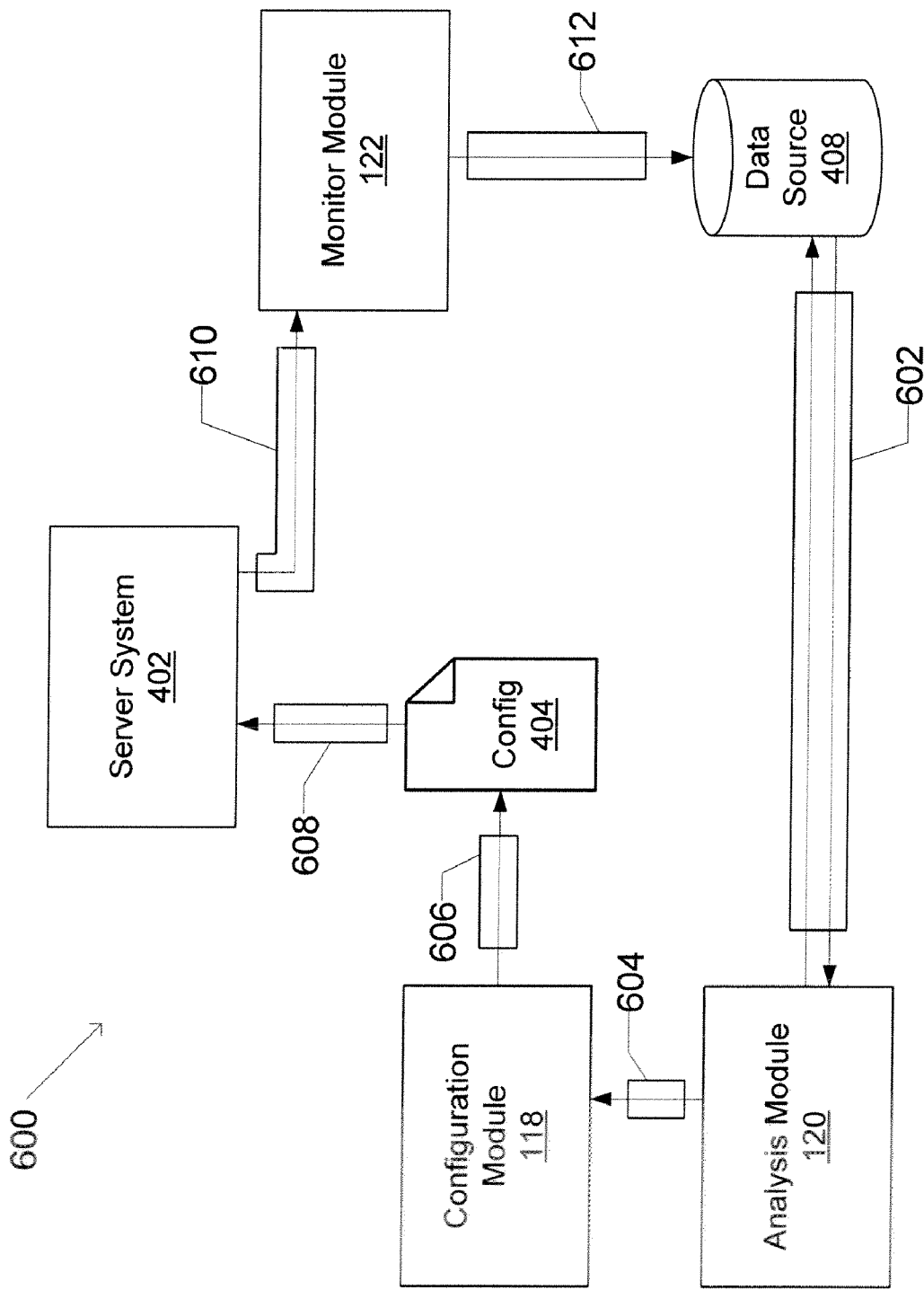
FIG. 6 illustrates the interactions between components of the optimization system associated with an embodiment of the invention.

FIG. 6 illustrates the interrelationship and interactions between the components of the production system 600. The production system 600 comprises a subset of the components of system 400 of FIG. 4. In an embodiment, the modules of the production system 600 exist on a single machine. The server system 402 is the production system to be optimized. A single configuration source is used for simplification.

As shown in FIG. 6, the arrows between components of the production system 600 represent the flow of data across communication channels in an embodiment of the invention. The dataflow establishes the logical arrangement between components. The server system 402 is coupled to the monitor module 122 and reads from configuration source 404. Both the analysis module 120 and the monitor module 122 can write to the data source 408. The analysis module 120 is coupled with the configuration module 118, and reads from and writes to the data source 408. The configuration module 118 stores the current configuration setting in configuration source 404, and can read from and write to the file.

FIG. 6 shows a series of read or write data transfers across communication channels in accordance with an embodiment of the invention. On initiating the production mode of FIG. 5, the analysis module 120 reads historical load data from the data source 408 via communication channel 602. It uses this data to determine the expected load level. The analysis module 120 then reads in the stored load levels from the data source 408 via the communication channel 602. The expected load is compared to the stored load to find the closest match. The analysis module 120 then reads in the optimal configuration for the matched load level from the data source via communication channel 602.

The configuration module 118 reads in the configuration from the analysis module 120 across communication channel 604 and writes the configuration to the configuration source 404 via communication channel 606. The server system 402 updates its configuration by reading across communication channel 608.

The monitor module 122 reads in performance metric and load pattern data from the server system 402 via communication channel 610 and writes it to the data source 408 via communication channel 612.

In an embodiment, the analysis module 120 reads the recorded performance metrics and load patterns from the data source 408 across communication channel 602. These performance metrics are analyzed to determine patterns in the data and establish new rules for predicting load level. The rules are written back to the data source 408 via communication channel 602.

In an embodiment the server system is a business intelligence system comprising a set of business intelligence servers such as a report repository server, a data analysis server, a report generation server and a report distribution server.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions for facilitating automatic server optimization in a system, the executable instructions comprising instructions to:
   accept a set of initialization parameters;
   analyze a set of one or more configuration sources;
   determine a plurality of configuration settings;
   receive a series of load levels;
   select a load level;
   test the plurality of configuration settings against the load level;
   identify an optimal configuration setting for the load level;
   record the optimal configuration setting;
   calculate an expected load level for an upcoming period of time;
   match the expected load level to a closest matching load level in the series of load levels;
   apply the optimal configuration setting for the closest matching load level to the system;
   monitor an actual load level and a set of performance metrics;
   store the actual load level and the set of performance metrics; and
   establish a set of rules for calculating the expected load level based on the actual load level and the set of performance metrics.

2. The non-transitory computer readable storage medium of claim 1 wherein the set of initialization parameters are selected from a user specified set and a default set.

3. The non-transitory computer readable storage medium of claim 1 wherein the set of initialization parameters are selected from a location of the set of one or more configuration sources, a set of requirements indicating how long the testing should run, a specification of available hardware and a list of optimization preferences.

4. The non-transitory computer readable storage medium of claim 3 wherein the optimal configuration is dependent on the list of optimization preferences.

5. The non-transitory computer readable storage medium of claim 1 wherein a configuration source in the set of one or more configuration sources comprises a set of attributes selected from one or more of maximum response time, CPU usage thresholds, RAM usage thresholds, fault tolerance, maximum number of threads, cache size, maximum number of users and available hardware required.

6. The non-transitory computer readable storage medium of claim 1 wherein the series of load levels is received from one or more of the system or a user.

7. The non-transitory computer readable storage medium of claim 1 wherein a load level in the series of load levels is associated with a time interval selected from a combination of one or more of year, time of year, time of month, day of week and time of day.

8. The non-transitory computer readable storage medium of claim 1 wherein selecting a load level, testing the plurality of configuration settings, identifying an optimal configuration setting and recording the optimal configuration setting are repeated for each load level in the series of load levels.

9. The non-transitory computer readable storage medium of claim 5 wherein the optimal configuration setting includes one or more of a set of values assigned to the set of attributes, a location of each interdependent server on the available hardware and a count of how many of each server type is required.

10. The non-transitory computer readable storage medium of claim 1 operative with interdependent servers in a system of two or more interdependent servers, including one or more server types.

11. The non-transitory computer readable storage medium of claim 10 wherein the system is a business intelligence system comprising one or more of a report repository server, a data analysis server, a report generation server and a report distribution server.

12. The non-transitory computer readable storage medium of claim 1 wherein the expected load level is calculated using a set of load parameters selected from one or more of current load, load during the last time interval, and load during the last N intervals.

13. A non-transitory computer readable storage medium, comprising executable instructions for facilitating automatic server optimization in a system, the executable instructions comprising instructions to:
   accept a set of initialization parameters;
   analyze a set of one or more configuration sources;
   determine a plurality of configuration settings;
   receive a series of load levels;
   test the plurality of configuration settings against the series of load levels, wherein testing comprises executable instructions to:
     select a load level;
     select a configuration setting;
     apply the configuration setting;
     simulate the load level; and
     record a set of performance metrics;
   identify an optimal configuration setting for each load level in the series of load levels;
   record the optimal configuration setting for each load level in the series of load levels;
   calculate an expected load level for an upcoming period of time;
   match the expected load level to a closest matching load level in the series of load levels;
   apply the optimal configuration setting for the closest matching load level to the system;
   monitor an actual load level and a set of performance metrics;
   store the actual load level and the set of performance metrics; and
   establish a set of rules for calculating the expected load level based on the actual load level and the set of performance metrics.

14. The non-transitory computer readable storage medium of claim 13 operative with interdependent servers in a system of two or more interdependent servers, including one or more server types.

15. The non-transitory computer readable storage medium of claim 13 wherein the system is a business intelligence system comprising one or more of a report repository server, a data analysis server, a report generation server and a report distribution server.

\* \* \* \* \*